United States Patent [19]

Jitschin et al.

[11] Patent Number: 4,941,351
[45] Date of Patent: Jul. 17, 1990

[54] TRANSPORTER FOR A ROTOR OF A GAS FRICTION MANOMETER

[75] Inventors: Wolfgang Jitschin, Borgholzhausen; Peter Röhl, Berlin, both of Fed. Rep. of Germany

[73] Assignee: Physikalisch-Technische Bundesanstalt, Braunschweig, Fed. Rep. of Germany

[21] Appl. No.: 192,710

[22] Filed: May 11, 1988

[30] Foreign Application Priority Data

May 11, 1987 [DE] Fed. Rep. of Germany ....... 3716016

[51] Int. Cl.$^5$ .......................... G01D 11/24; G01L 7/00
[52] U.S. Cl. ........................................ 73/431; 73/700
[58] Field of Search .................. 73/700, 431; 206/318; 384/624

[56] References Cited

U.S. PATENT DOCUMENTS 4,395,914 8/1983 Fremerey et al. .
4,619,144 10/1986 Fremery et al. .

FOREIGN PATENT DOCUMENTS 1828864 10/1960 Fed. Rep. of Germany .
  57456  8/1967 German Democratic Rep. .
0796086  1/1981 U.S.S.R. ............................. 206/318
1554913 10/1979 United Kingdom .

Primary Examiner—Donald O. Woodiel
Attorney, Agent, or Firm—Spencer & Frank

[57] ABSTRACT

A transporter for a rotor of a gas friction vacuum pressure meter comprises a housing accommodating the rotor; an ambient surrounding the metallic rotor within the housing during transport and being non-reactive with the rotor; and an arrangement for protecting the metallic rotor within the housing from physical and mechanical damage during transport.

18 Claims, 1 Drawing Sheet

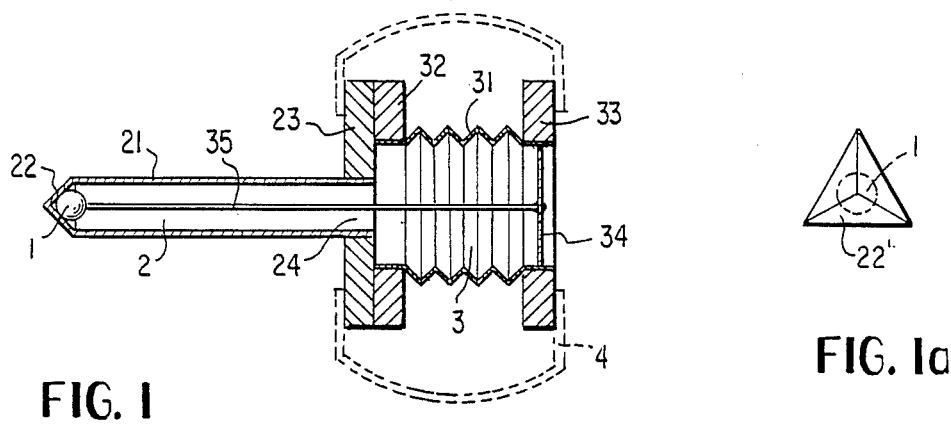
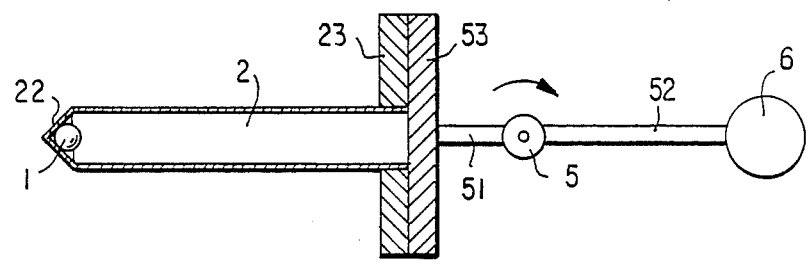
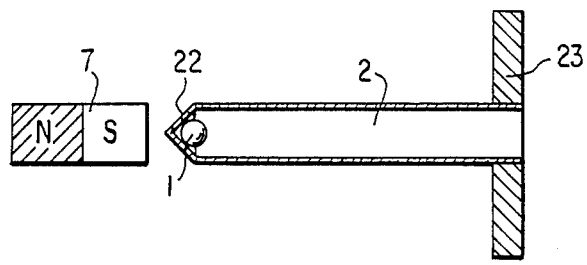
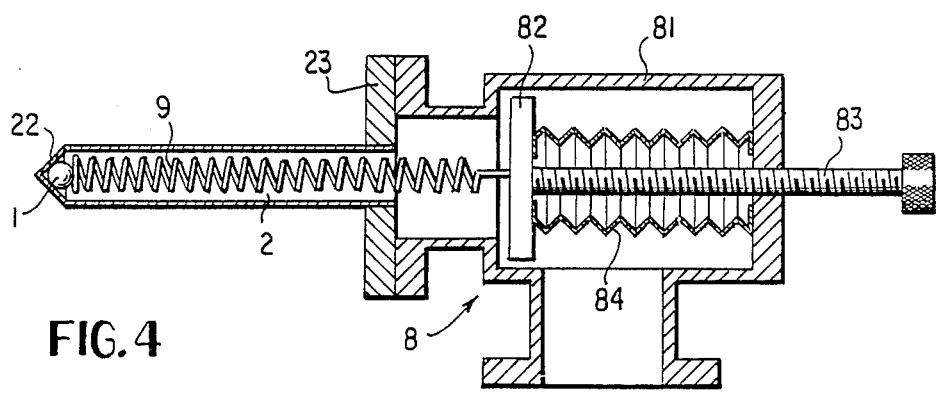

TRANSPORTER FOR A ROTOR OF A GAS FRICTION MANOMETER

FIELD OF THE INVENTION

The present invention relates to a transporter for the rotor of a gas friction vacuum pressure meter.

BACKGROUND OF THE INVENTION

U.S. Pat. Nos. 4,395,914 and 4,619,144 describe a system in which a gas pressure meter uses a rotor magnetically suspended for free rotation between the electric drive coils in a magnetic field within a tubular housing joinable to a vacuum system. The rotor is driven by the drive coils and maintained above a preset minimum rpm. The mode of operation of such prior art device is based on the pressure-dependent braking (deceleration) of the rotor. Accordingly, speed sensors are arranged in the measuring head of the instrument to detect and respond to the rotational frequency of the rotor, and further to transmit signals to an analyzer, which may be a digital computer. The analyzer analyzes the signals and computes the pressure in the chamber from the deceleration.

It has been found in practice that gas friction vacuum meters of this type show improved stability and resistance to reactive gases compared to other pressure meters used in a high vacuum. Because of this stability, the gas friction vacuum meter is also used as a secondary pressure normal, for example, in an international pressure comparison performed by the Bureau International des Poids et Mesures or used by the Deutsche Kalibrierdienst or also in plasma diagnosis. For such uses it is necessary to transport the gas friction vacuum gauge, for example, between a location of calibration and a location of use. Although changes in measured values amount to less than about 0.5% during careful handling in a laboratory, a change in location may produce changes up to several percentage points. These changes in calibration result from a change of the spherical surface of the rotor of the meter due to chemical processes, for example, due to corrosion in air, or due to mechanical action as a result of the rotor coming in contact with the walls of the tubular housing in which it is accommodated during transportation. This may cause striation or smoothing of the rotor surface. The accuracy of the gas friction vacuum meter as a transfer normal and the accuracy of the transfer of high vacuum pressures as a whole are therefore reduced due to the poor transportation conditions of the rotor of the gas friction vacuum meter.

SUMMARY OF THE INVENTION

It is an object of the invention to provide a carrier (transporter) for the rotor of a gas friction pressure vacuum meter which prevents changes in the calibration of the meter due to transportation of the rotor.

This object and others to become apparent as the specification progresses, are accomplished by the invention, according to which, briefly stated, a carrier for the rotor of a gas friction vacuum meter comprises a housing within the interior of which the rotor is received during transport, an ambient surrounding the rotor within the housing non-reactive with the rotor, and means for protecting the rotor within the housing from physical and mechanical damage.

By these means, changes in the surface of the rotor due to transportation are substantially avoided so that changes in the calibration of the gas friction vacuum meter using the rotating body or rotor are also reduced or prevented.

By using a specially provided carrier for the transportation of the rotor according to the invention, the accuracy and reliability of the meter is substantially retained while the cost required for the transporting device is significantly less than the price of the basic instrument of a gas friction manometer.

One advantageous feature of the invention is that the housing of the carrier in which the rotor is transported is airtight and is evacuated or filled with a gas which is inert with respect to the surface of the rotor. Thus, changes in the surface due to physical action or chemical reaction, for example, with the surrounding atmosphere, such as corrosion of the surface coating, are avoided.

Another advantageous feature of one preferred form of the invention is that the rotor and at least parts of the carrier can be heated, whereby an adsorption of undesirable gases at the rotor surface is avoided.

Other preferred forms of the invention avoid or reduce changes in the surface of the rotor due to mechanical contact with the container wall and the resulting roughening or smoothing of the surface of the rotor. For example, mechanical changes on the surface of the rotor can be avoided by magnetically suspending the rotor without contact, even during transportation. The housing of the rotor carrier may be carried in a special transportation container in which unavoidable mechanical shocks may be reduced in magnitude by special suspension. Remaining slight shocks may be compensated by high-performance servo-stabilization of the rotor, and this servo-stabilization may be battery operated to be portable.

Changes in the surface of the rotating body may also be reduced by retaining the rotor against a housing wall portion. Thus, the rotor does not move materially relative to the housing, and striations or smoothing of the surface are prevented. The rotor may be retained against the wall portion by a spring means, by gravity or by a centrifugal force resulting from a rotation of the housing about a shaft at which a counterweight is provided. The retention against the wall portion may be by magnetic force, supplied by a permanent magnet or by an electromagnet.

Structural features may also assist in reducing surface changes of the rotor. The surface contact of the rotor with the housing portion is desirably kept small compared to the total surface area of the rotor, for example, by suitably configuring the contact area of the rotor. Desirably, the contact area is disposed in the vicinity of the rotor poles. Changes in this region on the surface of the rotor influence the calibration of a meter using such rotor only slightly, because action at the meridian range of the rotor dominates the pressure measurement. Also, surface changes during transportation by the carrier may be kept small by a suitable selection of the surface materials of the rotor and of the housing.

The influence of changes to the surface during transport can be further reduced by a method in which simulated transport produces artificial "aging" of the surface of the rotor. Since after several hundreds to thousands of hours of simulated transport, a final state will be reached in which the surface can practically no longer be influenced, for example, by a transport of ten hours, it can be assumed that a calibration made after such simulated transport would be changed only slightly as a result of subsequent, actual transport.

BRIEF DESCRIPTION OF THE DRAWING

FIG. 1 is a schematic sectional side elevational view of a preferred embodiment of the invention.

FIG. 2 is a schematic sectional side elevational view of another preferred embodiment of the invention.

FIG. 3 is a schematic sectional side elevational view of a part of the structure of FIGS. 1 or 2, showing magnetic retaining means.

FIG. 4 is a schematic sectional side elevational view of yet another preferred embodiment of the invention.

FIG. 1a is an end elevational view of a modified part of FIG. 1.

DESCRIPTION OF THE PREFERRED EMBODIMENTS

Turning to FIG. 1, the carrier of the rotor 1 of a gas friction vacuum pressure meter has a housing 2 in which the rotor 1 is mechanically retained against a portion of the housing 2 during a measuring process and during transport. For performing the measuring process, the housing 2 may be connected to a pressure vessel. The housing 2 has an elongated wall portion 21 of cylindrical or polygonal shape. The rotor 1 is retained at a conical portion or location 22 of the housing 2 at the end of the elongated portion 21. In the alternative, as shown in FIG. 1a, the housing portion 22' is internally trilaterally pyramidal, resulting in a three-point contact between the rotor 1 and the housing portion 22'. A housing flange 23 is provided at the housing opening 24.

The carrier device further has a clamping device 3 which includes a forward flange 32 connectable to a housing flange 23 and a rear wall flange 33 which is movable toward or away from the forward flange 32. Between forward flange 32 and rear wall flange 33 a flexible bellows or spring bellows 31 is arranged which provides a gastight seal for the rotor 1. A holder or a rear wall 34 is fastened gastight to the rear wall flange 33. A pressure rod 35 fastened to the rear wall or holder 34 extends through the rear wall flange 33, the bellows 31, the forward flange 32 and the housing flange 23 into the elongated portion 21 to bear against the rotor 1 and retain it at the housing portion 22. It will be readily apparent that by virtue of either a circular contact (in case of a conical wall 22) or a three-point contact (in case of a trilaterally pyramidal wall 22') between the housing 2 and the rotor 1, the latter will be prevented from displacement in any direction, that is, the housing wall 22 or 22' ensures a tri-dimensional stability (immobility) of the rotor 1, as it is pressed by the pressure rod 35.

When the bellows 31 is in a compressed state, the tip of the pressure rod 35 abuts against rotor 1 and retains it at the location 22 of the housing 2. This may be accomplished by moving the pressure rod 35 against the rotor 1 to shift the rotor 1 into its final position at its location 22. Then an immobilizing device such as a clamping yoke 4, shown in dashed lines, is applied to urge rear wall flange 33 toward forward flange 32. A similar effect may be achieved if the bellows 31 are of resilient construction. The pressure against the rotor 1 may be varied by displacing the rear wall flange 33 in the direction of the double-headed arrow shown in FIG. 1.

The carrier of FIG. 1 may itself be placed in a container (not shown) which may be additionally protected against the shocks of transportation by a special suspension system.

FIG. 2 illustrates another embodiment of the invention. In the carrier of FIG. 2, centrifugal force maintains the rotor 1 against the wall portion 22. The housing flange 23 mates with a flange 53 which also closes and seals the mouth of the housing 2 in a gastight manner. A shaft 51 secured to the flange 53 is rotated about an axis of rotation 5 to generate the centrifugal force pressing the rotor outwardly, against the housing location 22. A counterweight 6 is connected to an extension 52 of shaft 51 in order to balance the entire assembly during rotation. A suitable battery-operated motor (not shown) can be employed to rotate the housing with a speed that is sufficient to ensure that under all operating conditions rotor 1 is maintained against the tip 22 by centrifugal force. The carrier of FIG. 2 may be accommodated in a suitable housing which, in turn, may be arranged in a transporting container equipped with a special suspension device so that the larger shocks of transportation are absorbed. By virtue of a power supply from a battery, the carrier may be transported independently of external power sources.

FIG. 3 illustrates still another embodiment for maintaining the rotor 1 against a portion 22 of the housing 2. One pole of an electromagnet or permanent magnet 7 is disposed adjacent the housing tip 22. Thus, the magnetizable rotor 1 is held against the housing tip 22.

The carrier of FIG. 3 may also be disposed in or on a further housing (not shown) which may be suspended in a fashion to absorb the larger shocks of transportation.

Turning now to FIG. 4, the arrangement shown therein may be inserted without any further modifications into the measuring head of current, commercially available gas friction vacuum pressure meters. The housing flange 23 is attached to a commercially available corner valve 8 which simultaneously serves to provide a gastight seal and to drive the immobilizing arrangement for the rotor 1. The corner valve 8 includes a valve body 81 having a rear wall. A valve stem 83 is screwed into and through the threaded bore of the rear wall and carries at its end a valve disc 82. The part of valve stem 83 inside the valve body 81 is surrounded by a bellows 84 disposed between the rear wall of valve body 81 and the valve disc 82. One end of a compression spring 9 is fastened to the valve disc 82 and projects into the interior of the carrier housing 2 to press against the rotor 1, retaining the rotor 1 in this portion of housing during transportation. When the valve stem 83 is screwed forward, the valve disc 82 closes the valve 8 against the valve body 81.

For a gas pressure measurement, rotor housing 2 is inserted into the measuring head of a gas friction vacuum pressure gauge or meter and the valve 8 is opened by turning the valve stem 83 to withdraw the valve disc 82 toward the rear wall of valve housing so that the disc 82 is positioned in the region of the rear wall. In this open state of valve 8, the gas line is open and rotor 1 is freely movable for the purpose of measuring the gas pressure.

For transportation, corner valve 8 is closed, that is, valve stem 83 is screwed into the rear wall of valve body 81. Thus, the rotor 1 and the housing 2 are sealed gastight. Compression spring 9, formerly withdrawn, is now pressed against the rotor 1 and mechanically retains the rotor 1 at the tip 22 of the housing 2 over a small area of contact. By using a compression spring 9 to retain the rotor 1, the force exerted against the rotor may be controlled. Scratches or striations on the surface of the rotor 1 are reduced or avoided entirely by using a compression spring 9, the top which is polished.

To prepare the carrier for transport, valve 8 and housing 2 attached thereto, with valve stem 83 screwed outwardly, may be heated to a temperature of about 400° C. to reduce the risks of contamination of the surface of the rotor 1.

After transportation, the housing 2 may be inserted into the measuring head of a gas friction vacuum meter and, after connecting the corner valve 8 to a pressure vessel, the valve stem 83 can be screwed out to prepare the carrier and the rotor for a gas pressure measurement.

The various embodiments described can be supplemented or combined with one another in various ways. For example, the housings may be closed airtight and may be heated up to about 400° C. to reduce contamination. Also, they may be suspended in a transport container so that the greater transportation shocks are absorbed by the suspension of the transportation system. Therefore, the above-described carriers need be designed only for smaller shocks.

Also, the rotor may be fixed by adding to a mechanical force which retains the rotator in the housing an electromagnetic or permanent magnetic force.

As described in the above-mentioned U.S. Pat. Nos. 4,395,914 and 4,619,144, the rotor may be held in suspension by a servo-stabilizing device in a similar manner as during a pressure measurement, to avoid any contact of the surface of the rotor with the housing wall of the carrier. For this purpose, the servo-stabilization device may be provided with setting elements and sensors which keep the rotor in a suspended state within the housing 2 even during transportation. This suspension arrangement may also be combined with a suspension of the transportation means for the carrier so that the servo-stabilization device absorbs the smaller or low acceleration shocks while the transportation suspension absorbs the greater or higher acceleration shocks.

The present disclosure relates to subject matter contained in Federal Republic of Germany Patent Application No. P 37 16 016.8 (filed May 11, 1987) which is incorporated herein by reference.

It will be understood that the above description of the present invention is susceptible to various modifications, changes and adaptations, and the same are intended to be comprehended within the meaning and range of equivalents of the appended claims.

We claim:

1. A transporter for a rotor of a gas friction vacuum pressure meter comprising:
   a housing accommodating the rotor;
   an ambient surrounding the metallic rotor within the housing during transport; the ambient being inert, whereby said ambient is non-reactive with the rotor; and
   means for protecting the metallic rotor within the housing from physical and mechanical damage during transport.

2. A transporter as defined in claim 1, the housing being gastight and the inert ambient of the housing consisting essentially of one of: a vacuum and a gas inert with respect to the surface of the rotor.

3. A transporter as defined in claim 2, wherein the transporter has a portion surrounding the rotor; the rotor and the portion being heat resistant to permit out-gassing by heating.

4. A transporter as defined in claim 1, the housing having a housing wall portion, the means for protecting the rotor comprising the wall portion and a retaining means for retaining the rotor on the wall portion.

5. A transporter as defined in claim 4, the retaining means comprising a spring means.

6. A transporter for a rotor of a gas friction vacuum pressure meter comprising:
   (a) a housing accommodating the rotor; said housing having a wall portion;
   (b) an ambient surrounding the metallic rotor within the housing during transport; the ambient being non-reactive with the rotor;
   (c) means, including said wall portion, for protecting the metallic rotor within the housing from physical and mechanical damage during transport; and
   (d) retaining means for retaining the rotor in the wall portion; said retaining means comprising a mounting for rotating the housing about an axis, whereby the rotation about the axis retains the rotor against the wall portion by centrifugal force.

7. A transporter as defined in claim 6, further comprising a counterweight opposite the rotor with respect to the axis.

8. A transporter for a magnetic rotor of a gas friction vacuum pressure meter comprising:
   (a) a housing accommodating the magnetic rotor; said housing having a non-magnetic wall portion;
   (b) an ambient surrounding the metallic rotor within the housing during transport; the ambient being non-reactive with the rotor;
   (c) means; including said wall portion, for protecting the metallic rotor within the housing from physical and mechanical damage during transport; and
   (d) retaining means for retaining the rotor in the wall portion; said retaining means comprising magnetic means outside the wall portion attracting the rotor against the wall portion by magnetic attractive force to clamp the rotor against the wall portion.

9. A transporter as defined in claim 8, the magnetic means comprising a permanent magnet.

10. A transporter as defined in claim 8, the magnetic means comprising an electromagnet.

11. A transporter for a rotor of a gas friction vacuum pressure meter comprising:
    (a) a housing accommodating the rotor; said housing having a wall portion;
    (b) an ambient surrounding the metallic rotor within the housing during transport; the ambient being non-reactive with the rotor;
    (c) means; including said wall portion, for protecting the metallic rotor within the housing from physical and mechanical damage during transport; said rotor resting on the housing wall portion at the minimum number of points to assure tri-dimensional stability; and
    (d) retaining means for retaining the rotor in the wall portion.

12. A transporter as defined in claim 11, the wall portion being internally trilaterally pyramidal and the rotor being circularly symmetrical and resting on three internal points of the wall portion.

13. A transporter as defined in claim 11, the wall portion being conical, the metallic rotor being a ball, the points lying on a circle.

14. A transporter as defined in claim 11, further wherein the wall portion is polished in a zone of said points.

15. A transporter for a rotor of a gas friction vacuum pressure meter comprising:
   (a) a housing accommodating the rotor; said housing having a wall portion;
   (b) an ambient surrounding the metallic rotor within the housing during transport; the ambient being non-reactive with the rotor;
   (c) means, including said wall portion, for protecting the metallic rotor within the housing from physical and mechanical damage during transport;
   (d) retaining means for retaining the rotor in the wall portion;
   (e) a housing flange affixed to the housing;
   (f) the housing wall portion comprising a tubular part having an end receiving the rotor;
   (g) a valve comprising a valve body, a valve flange attached to the valve body; a valve disc for closing the valve against the valve body, and a valve stem for operating the valve, the housing flange and the valve flange mating and being connected gastight to each other; and
   (h) a compression spring between the valve disc and the rotor; the spring having one end pressing the rotor against the end of the tubular part, the spring having another end connected to the valve disc; the stem, when actuated to close the valve disc against the valve body, sealing the valve stem against the valve body, and further pressing the compression spring between the valve disc and the rotor, whereby the wall portion, the flanges and the valve enclose an ambient for the rotor.

16. A transporter as defined in claim 15, wherein an end of the spring pressing against the rotor is polished.

17. A transporter for a rotor of a gas friction vacuum pressure meter comprising
   a housing accommodating the rotor and adapted to be inserted, with the rotor, into the pressure meter to form part thereof during a measuring process; and
   retaining means adapted to be secured to said housing for sealing the housing gastight and for immobilizing the rotor within the housing during transport of the rotor apart from the meter; said housing containing an inert ambient, whereby said ambient is non-reactive with the rotor.

18. A transporter for a rotor of a gas friction vacuum pressure meter comprising:
   (a) a housing accommodating the rotor; said housing having a wall portion;
   (b) an ambient surrounding the metallic rotor within the housing during transport; the ambient being non-reactive with the rotor;
   (c) means, including said wall portion, for protecting the metallic rotor within the housing from physical and mechanical damage during transport; and
   (d) retaining means for retaining the rotor in the wall portion; said retaining means comprising:
      (1) a first flange including a rear wall of said retaining means;
      (2) a second flange being connected gastight to the housing flange and being spaced from said first flange;
      (3) a flexible bellows connecting the first and second flanges gastight; and
      (4) a rod fastened to the rear wall and projecting from the rear wall between the first and second flanges, the housing flange and the bellows, into the housing and pressing against the rotor to retain the rotor against the wall portion.

* * * * *